United States Patent
Galyas et al.

(10) Patent No.: US 6,879,599 B1
(45) Date of Patent: Apr. 12, 2005

(54) MAPPING OF TRANSCODER/RATE ADAPTOR UNIT PROTOCOLS ONTO USER DATAGRAM PROTOCOLS

(75) Inventors: Peter Galyas, Täby (SE); Stefan Wilhelm Jung, Brottby (SE); Lars Westberg, Enköping (SE)

(73) Assignee: Telefonaktlebolaget LM Ericsson (publ), Stockholm (SE)

( * ) Notice: Subject to any disclaimer, the term of this patent is extended or adjusted under 35 U.S.C. 154(b) by 833 days.

(21) Appl. No.: 09/627,913

(22) Filed: Jul. 28, 2000

Related U.S. Application Data (60) Provisional application No. 60/179,315, filed on Jan. 31, 2000.

(51) Int. Cl.[7] .................................................. H04J 3/22
(52) U.S. Cl. ........................ 370/466; 370/340; 370/341; 370/522; 355/354; 713/151
(58) Field of Search ................................ 370/469, 471, 370/522, 354, 467, 340, 341, 466, 474, 465, 476, 477, 480, 498, 209, 331, 337, 355, 489, 352, 347; 455/403, 560, 436, 463, 445, 422, 422.1, 433, 408, 435.1; 713/151; 375/354

(56) References Cited

U.S. PATENT DOCUMENTS

| | | | | |
|---|---|---|---|---|
| 5,892,802 | A | 4/1999 | Jung et al. | 375/354 |
| 6,501,953 | B1 * | 12/2002 | Braun et al. | 455/436 |
| 6,529,497 | B1 * | 3/2003 | Hjelm et al. | 370/347 |
| 6,671,287 | B1 * | 12/2003 | Huttunen et al. | 370/469 |
| 2002/0058507 | A1 * | 5/2002 | Valentine et al. | 455/433 |

OTHER PUBLICATIONS

G. Mamais, M. Markaki, M.H. Sherif and G. Stassinopoulos; *Evaluation of the Casner–Jacobson Algorithm for Compressing the RTP/UDP/IP Headers:* Third IEEE Symposium on Computers and Communications, ISCC 1998; Jun. 30–Jul. 2, 1998; pp. 543–548.

Lars–Åke Larson, Mikael Degermak and Stephen Pink; *Efficient Use of Wireless Bandwidth for Multimedia Applications;* Nov. 15–17, 1999; pp. 187–193.

PCT International Search Report dated Jun. 14, 2001.

* cited by examiner

Primary Examiner—Phirin Sam
Assistant Examiner—Anthony Ton (57) ABSTRACT

A telecommunications system and method are disclosed for mapping a Transcoder/Rate Adaptor (TRAU) protocol onto a User Datagram Protocol (UDP) for use in an Internet Protocol (IP) based Base Station System (BSS) architecture. All in-band control bits in the TRAU protocol are not relevant when using the UDP protocol. Therefore, when speech information is mapped onto a UDP datagram for transfer to a Channel Codec Unit(CCU) in a Base Transceiver Station (BTS), some of the information normally transferred between a CCU and the TRAU can be removed. For example, a Time Alignment command included in some of frame types is not needed, and should be removed. In addition, bits relating to a frame structure, such as TRAU synchronization bits, tail bits and spare control bits, should be removed from all frame types. Furthermore, a new control bit that contains a sequence number must be added to handle reordering of a packet data stream.

16 Claims, 5 Drawing Sheets

MAPPING OF TRANSCODER/RATE ADAPTOR UNIT PROTOCOLS ONTO USER DATAGRAM PROTOCOLS

This application claims priority under 35 U.S.C. 119(e)(1) of co-pending U.S. Provisional Application No. 60/179,315, filed on Jan. 31, 2000.

BACKGROUND OF THE PRESENT INVENTION

1. Field of the Invention

The present invention relates generally to transcoder/rate adaptor units within base station systems, and specifically to transcoder/rate adaptor unit protocols.

2. Background and Objects of the Present Invention

The Global System for Mobile (GSM) telecommunications network provides a set of network capabilities that are defined by standard protocols and functions that enable telecommunications services to be offered to millions of subscribers throughout the world. The GSM system has a modular network architecture with standardized circuit-switched interfaces between segments.

In a typical GSM system, the radio access network is commonly referred to as a Base Station System (BSS). Within the BSS are two logical nodes, the Base Station Controller (BSC) and the Base Transceiver Station (BTS). The BTS is responsible for radio transmission and reception in a single cell, and provides the capacity for handling a number of calls within the cell. Since GSM systems utilize the Time Division Multiple Access (TDMA) concept, each carrier frequency is divided into eight timeslots, which can be assigned with either control channels or traffic channels. Control channels carry information used by the network for supervision and management of calls, while traffic channels carry voice and data between subscribers involved in call connections. The traffic channels can be either full-rate, which occupies an entire timeslot or half-rate, which occupies only one-half of a timeslot.

The BSC interworks with a Mobile Switching Center (MSC) via an open interface, terms the A-interface, and one or more BTS's via respective Abis interfaces. One of the main functional responsibilities of the BSC is speech coding and rate adaptation. This responsibility is handled by one of a pool of Transcoder/Rate Adaptor Units (TRAUs) within a Transcoder Controller (TRC) in the BSC. Each TRAU is capable of transcoding Pulse Code Modulated (PCM) speech from 564 kilobits per second (kbps) on the MSC side to 16 kbps (for full-rate traffic channels with 13 kbps for speech and 3 kbps for signaling) on the BTS side. Thus, each TRAU can submultiplex four full-rate traffic channels on the BTS side into one 64 kbps PCM channel on the MSC side. For data, the TRAU adapts the rate between 8 kbps and 16 kbps.

In a typical call connection, the MSC requests assignment of a traffic channel via the A-interface to the BSC. In response, the BSC requests resources from the TRC via an Ater interface, which allocates a free TRAU, chooses a 64 kbps path towards a 64 kbps circuit at the A-interface and sets up a free 16 kbps circuit for a path towards the BSC. Thereafter, the BSC sets up a 16 kbps path to the BTS via the Abis interface. Finally, the BTS allocates the appropriate radio resources (timeslot) and a Channel Codec Unit (CCU), which is responsible for channel coding/decoding over the air interface.

One of the drawbacks of conventional circuit-switched GSM BSS's is the low transmission efficiency and complex connection switching involved in establishing call connections. Another drawback is that both the BSC and the TRC must handle both signaling and payload (speech or data).

To overcome these drawbacks, packet switching can be introduced into the BSS transmission infrastructure. In a packet based network, all types of traffic (signaling, speech or data) can be mixed together, provided that Quality of Service (QoS) standards are met. The packet switched BSS is based on the Internet Protocol (IP), which is the main stream packet based connectionless protocol.

In the packet switched BSS, the BSC is divided into a Radio Network Server (RNS) node, which handles only signaling, and a Media Gateway (MGW) node, which handles only payload and corresponds to the TRC. In this architecture, the payload is routed directly between the MGW and the BTS without passing through the RNS, whereas the signaling is routed between the RNS and BTS without passing through the MGW. For a complete description of the packet switched BSS architecture, reference is made to co-pending application Ser. No. 09/494,606, which is hereby incorporated by reference.

When changing the transmission structure in a GSM radio access network from circuit switched to a packet switched IP network, the protocols used between the various functional components may need to be modified to account for the new structure of the packet switched network. For example, the TRAU in the BSC and the CCU in the BTS communicate today through a protocol specified in GSM TS 08.60 and 08.61. This protocol is tightly coupled to the transmission structure of the circuit switched 64 kbps timeslots and sub-channels of 16 and 8 kbps. Therefore, when the transmission structure changes to a packet switched IP network, the TRAU protocol will not function properly.

It is, therefore, an object of the present invention to modify the TRAU protocol to operate within a packet switched IP based network.

It is a further object of the present invention to enable a connection between the CCU and the TRAU over an IP network in a simple and efficient way.

SUMMARY OF THE INVENTION

The present invention is directed to telecommunications systems and methods for mapping the TRAU protocol onto a User Datagram Protocol for use in an IP based BSS architecture. All in-band control bits in the TRAU protocol are not relevant when using the UDP protocol. Therefore, when speech information is mapped onto a UDP datagram for transfer to the CCU in the BTS, some of the information normally transferred between the CCU and the TRAU can be removed. For example, the Time Alignment command included in some of the frame types is not needed, and should be removed. In addition, the bits relating to the frame structure, such as the TRAU synchronization bits, tail bits and spare control bits, should be removed from all frame types. Furthermore, a new control bit that contains a sequence number must be added to handle reordering of the packet stream.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
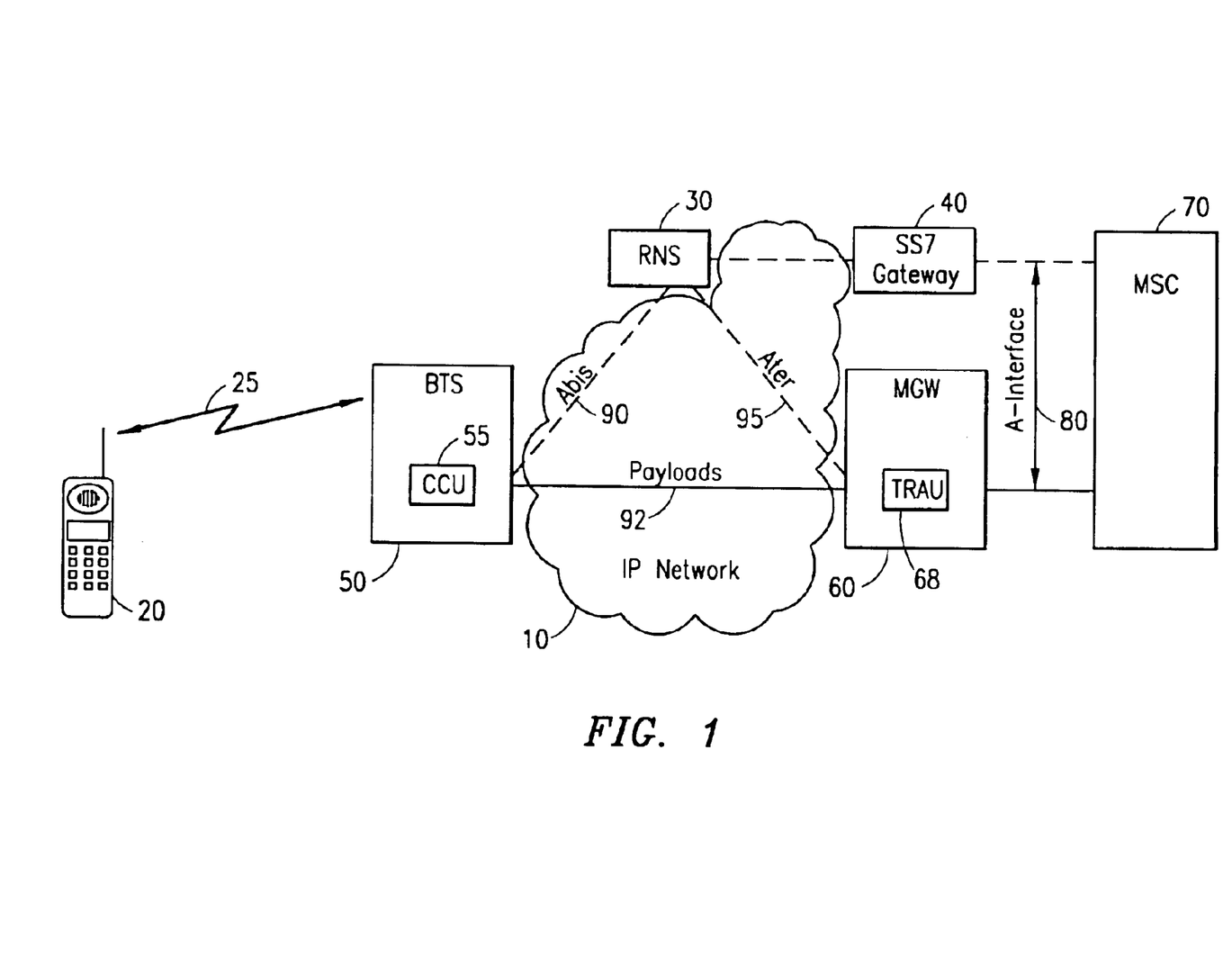
FIG. 1 is a block diagram illustrating an Internet Protocol (IP)-based base station system architecture of the kind used in embodiments of the present invention.

With reference now to FIG. 1 of the drawings, an Internet Protocol (IP) based Base Station System architecture is illustrated in a Global System for Mobile (GSM) telecommunications system. The IP-BSS is made up of three nodes interconnected through an IP network 10. The first node is the Base Transceiver Station (BTS) 50, which functions the same as a circuit-switched BTS, but with IP support.

As is known in the art, the BTS 50 includes all of the physical equipment needed to provide radio coverage to the cell for which it is responsible. Such equipment includes one or more transceivers for transmitting/receiving speech and data to/from the air interface and Mobile Stations (MSs) 20, and one or more Channel Codec Units (CCUs) 55 for performing channel coding and decoding to/from traffic channels assigned to the MSs 20 on the air interface 25. In the IP based BSS architecture, the BTS 50 has one or more IP addresses associated with it, and each traffic channel/CCU 55 has a separate combination of a User Datagram Protocol (UDP) port number and an IP address associated with it.

The second node making up the IP based BSS is a Media Gateway (MGW) 60 that terminates the A-interface 80 to the Mobile Switching Center (MSC) 70. In addition, the MGW 60 contains the pool of Transcoder/Rate Adaptor Units (TRAUs) 68, which are allocated at the A-interface 80 in a similar manner as the circuit-switched TRAUs 68. The MGW 60 is connected to a User Datagram Protocol (UDP) port having one or more associated IP addresses, and each TRAU 68 has a separate combination of a UDP port number and an IP address associated with it.

The third node of the IP based BSS is the Radio Network Server (RNS) 30. The RNS 30 corresponds to the Base Station Controller (BSC) of circuit-switched BSSs, except that the RNS 30 does not switch payloads. Instead, the RNS 30 handles only signaling to and from the BTS 50 and the MGW 60. Signaling between the RNS 30 and the MSC 70 goes through an SS7 gateway 40, which performs protocol conversion between SS7 on the A-interface 80 and IP on the IP network 10. It should be understood that the SS7 gateway 40 and MGW 60 can be logically contained within the same node or within separate nodes.

Speech and data (referred to hereinafter as payloads) are routed directly between the MGW 60 and the BTS 50 over interface 92 using UDP over IP (UDP/IP), without passing through the RNS 30. UDP connection-oriented services are used to send messages where the integrity of the data is not as important. UDP is not reliable (there are no retransmissions) and lost packets are discarded. However, this is usually acceptable for speech if the frequency of lost frames is not too high. Since UDP offers the shortest delay, UDP is the preferred protocol for transmission of payloads.

In FIG. 1, the signaling routes are shown by dotted lines, while the payload routes are shown by solid lines. The A-interface 80 signaling is routed between the RNS 30 and the SS7 gateway 40, while the Abis interface 90 signaling is routed between the RNS 30 and the BTS 50. There is also a modified Ater interface 95 between the RNS 30 and the MGW 60 to allocate a particular TRAU 68 for a call. It should be noted that all IP based BSS internal signaling (between the RNS 30 and BTS 50 and RNS 30 and MGW 60) uses Transmission Control Protocol (TCP) over IP (TCP/IP). TCP connection-oriented services provide reliable delivery of data between the nodes by establishing a connection before the information is sent. Thus, TCP guarantees that the information is error free and in sequence, which is necessary for signaling information.

In conventional circuit-switched BSSs, when the TRAU 68 is positioned remote to the BTS 50, the information between the CCU 55 and the remote TRAU 68 is transferred in frames with a fixed length of 320 bits (20 ms). Within these TRAU frames, both the payload and associated TRAU control signals are transferred. However, with reference now to FIG. 2 of the drawings, in an IP based BSS architecture, instead of TRAU frames, the payload and associated TRAU control information are encapsulated into UDP datagrams 15 (also referred to as packets). These UDP packets 15 are transferred between the TRAU 68 and CCU 55 through the IP network 10.

In a typical call connection scenario, a payload connection is established between the MS 20 and MSC 70 (shown in FIG. 1) via the BTS 50 and MGW 60. The RNS 30 (also shown in FIG. 1) stores a list of UDP port numbers 52a–c and associated traffic channels 58a–c, respectively. Each traffic channel 58a–c is associated with a particular CCU55a–c, respectively. Therefore, at call setup, when the RNS 30 receives the circuit identity code (CIC) for the selected A-interface circuit (not shown in FIG. 2) and the allocated traffic channel, here traffic channel 58b, from the MSC 70, the RNS 30 determines the UDP port number 52b of the allocated traffic channel 58b and associated CCU 55b. Thereafter, the RNS 30 informs the MGW 60 of the UDP port number 52b of the allocated traffic channel 58b and the CIC of the selected A-interface circuit.

Figure 2:
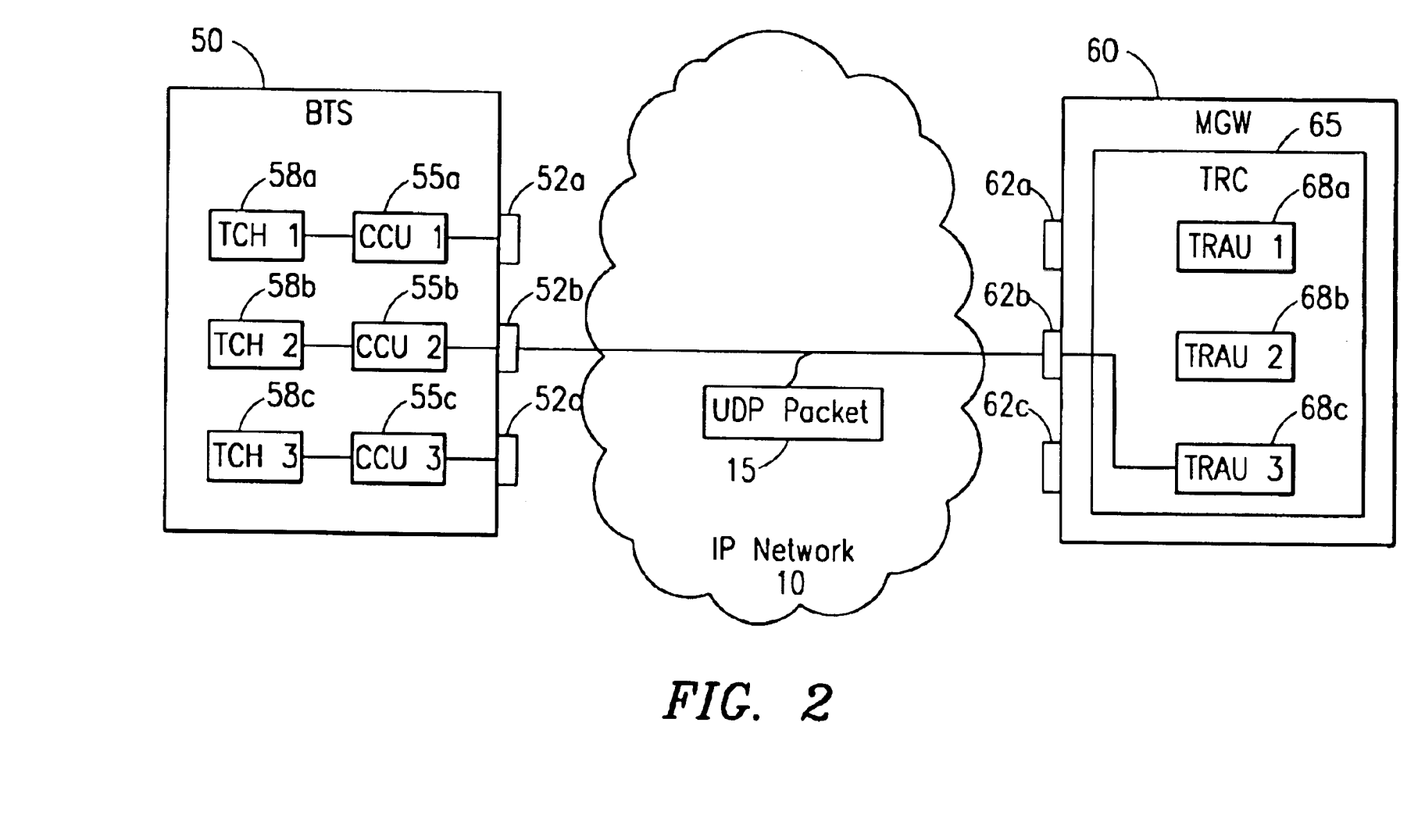
FIG. 2 is a block diagram illustrating the IP based interface between the Transcoder/Rate Adaptor Unit (TRAU) and the Channel Codec Unit (CCU) in accordance with embodiments of the present invention.

In response, the MGW 60 analyzes the TRAUs 68a–c within the MGW 60 and allocates a free TRAU, here TRAU 68c. Thereafter, the MGW 60 connects the Pulse Code Modulated (PCM) side of the selected TRAU 68c to the selected A-interface circuit. In addition, a free UDP port number, here UDP port number 62b, of the available UDP port numbers 62a–c is also selected, and the allocated TRAU 68c is connected to this port number 62b. Thereafter, the MGW 60 sends the selected UDP port number 62b to the RNS 30, which sends this UDP port number 62b to the BTS 50 in a Channel Activation message for the selected traffic channel 58b. When the first payload frame is channel decoded by the CCU 55b, the CCU 55b appends TRAU control bits to the frame and encapsulates both the payload and TRAU control bits (hereinafter referred to collectively as TRAU information) into a UDP packet 15 for transmission to the selected TRAU 68c in the MGW 60. Likewise, when the first payload frame is speech coded/rate adapted by the selected TRAU 68c, the TRAU 68c appends the appropriate TRAU control bits, and encapsulates the TRAU information into a UDP packet 15 for transmission to the CCU 55b in the BTS 50.

Figure 3A:
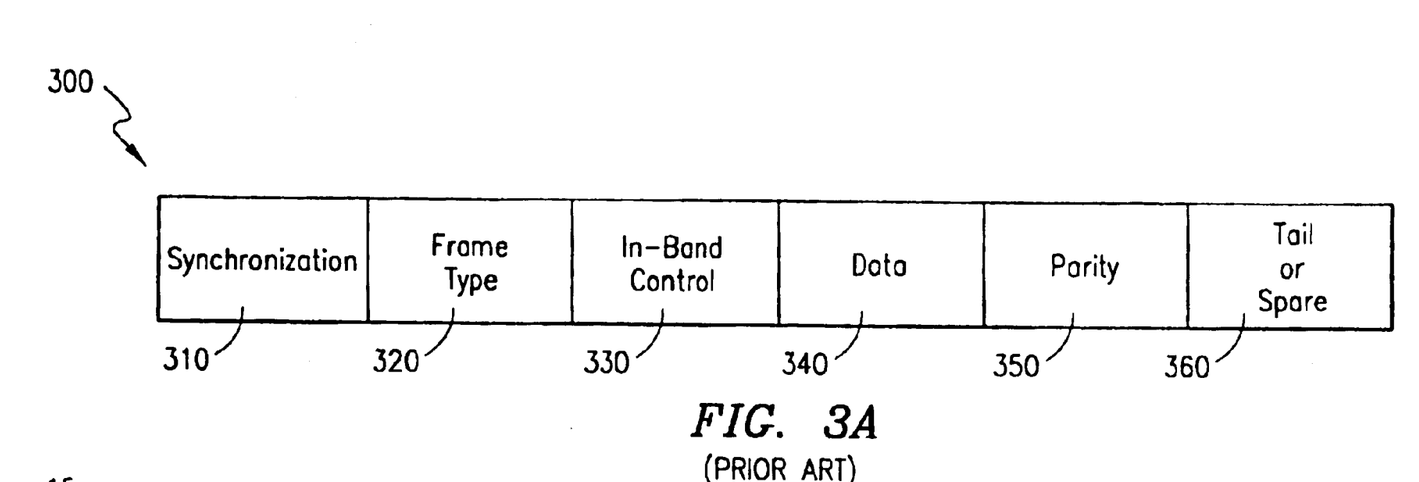
FIG. 3A illustrates a prior art TRAU frame.

FIG. 3A illustrates a conventional TRAU frame 300 used in a circuit-switched BSS architecture. Each TRAU frame 300, regardless of frame type, must contain 320 bits to make up a 20 ms TRAU frame 300. The first two octets (octets 0 and 1) of any TRAU frame 300 provide frame synchronization 310, with all of the bits in the first two octets coded binary "0." Thereafter, the first bit in octet numbers 2, 4, 6, 8, . . . 38 is coded binary "1" to achieve frame synchronization.

In addition, each frame 300 also includes the following information: frame type 320, in-band control information 330, data 340 and parity bits 350. Furthermore, each frame 300 may also include a number of tail or spare bits 360. Not all of the in-band control information 330 applies to each frame type 320 or to the same frame type 320 in both the uplink and downlink. Therefore, there may also be a number of spare bits (not shown) in the in-band control information 330. The tail bits 360 can be, for example, time alignment bits, which can be removed if the timing of the frame 300 needs to be advanced. Otherwise, the tail bits 360, along with all spare bits, are coded binary "1."

When mapping the TRAU protocol onto the UDP, much of the TRAU information remains the same. For example, with reference now to FIG. 3B of the drawings, the frame type information 320 included in the UDP packet 15 is the same as the frame type information 320 included in the conventional TRAU frame 300. The frame type 320 can be one of the following: a full rate or enhanced full rate speech frame, an adaptive multi-rate speech frame, an operation and maintenance frame, a data frame, an extended data frame, an idle speech frame or a silence descriptor frame. It should be noted that each frame type 320 may have a different priority associated with it, and therefore priority bits (not shown) may also be included in the UDP packet 15.

Figure 3B:
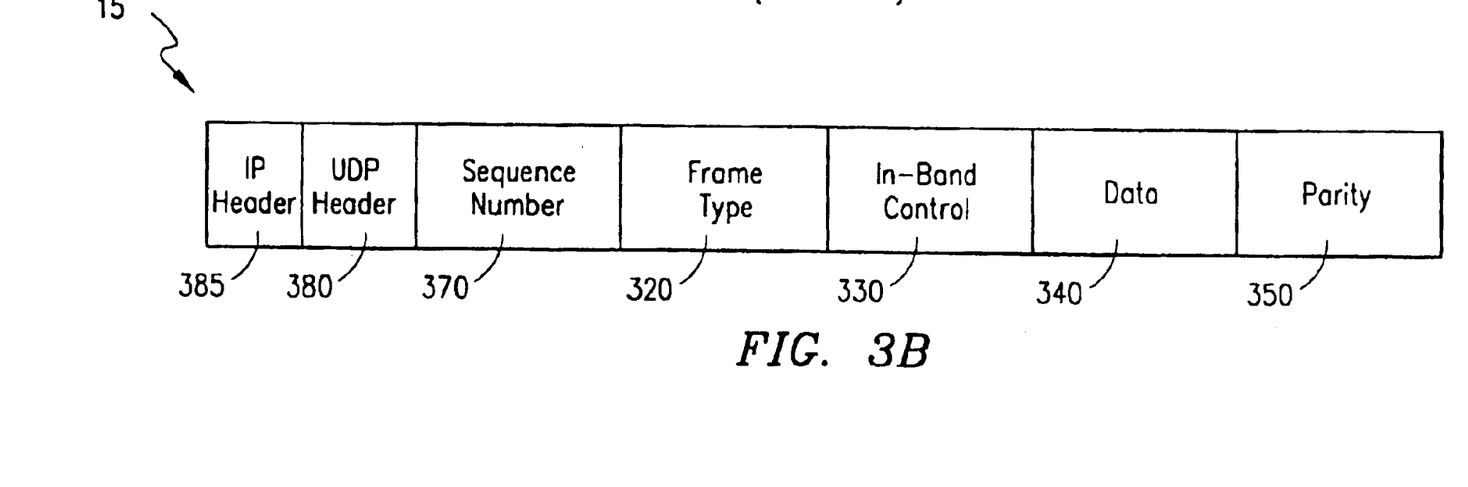
FIG. 3B illustrates a sample User Datagram Protocol (UDP) datagram containing TRAU frame information in accordance with preferred embodiments of the present invention.

In addition, the data bits 340 transferred in the UDP packet 15 are the same as the data bits 340 transferred in the circuit-switched TRAU frame 300. In either case, the data bits 340 include only the compressed speech/data (payload). Therefore, as in the TRAU frame 300, some of the most sensitive data bits 340 may be protected by a number of parity bits 350. The number of parity bits 350 is dependent upon the CCU 55 rate for speech services and/or data services. In some cases, the parity bits 350 can be excluded altogether. The variation in the number of combined data bits 340 and parity bits 350 is accounted for in the circuit-switched TRAU frame 300 by including a number of bits that can be used as parity bits 350 in the TRAU frame 300. However, since only the actual data bits 340 and parity bits 350 are transferred in the IP network 10, the length of the UDP packet 15 will vary depending on which CCU 55 is used.

Although a majority of the TRAU information remains the same between the TRAU frame 300 and the UDP packet 15, there are several changes which need to be made to the UDP packet 15 to account for the behavior of the IP network 10. For example, one or more new control bits 370 that contain a sequence number must be added to handle reordering of the packet data stream. In a packet network 10, rerouting of packets 15 sometimes occurs. To be able to handle this, a sequence number 370 is needed by the receiver to determine the order of the received packets 15, and to ensure that all packets 15 are received.

The length of the sequence number 370 is preferably chosen as a function of the maximum jitter. The jitter is a delay variation as seen by the receiver (TRAU 68 or CCU 55). For example, if the CCU 55 transmits packets 15 in twenty millisecond intervals in the order 1, 2, 3 and 4, but the TRAU receives the packets in the order 1, 3, 2 and 4, packet number 2 has been delayed in the IP network at least 20 ms longer than packet number 3. The sequence number 370 informs the TRAU 68 that packets 2 and 3 have changed place in the order received. The higher the jitter, the more sequence numbers are needed in a sequence. Since the UDP packets 15 are delivered with 20 ms spacing, the number of sequence numbers in a sequence can be a multiple of 20 ms. For example, if the maximum jitter in a network is 100 ms, the number of sequence numbers in a sequence would need to be at least six. In this case, three bits of the UDP packet 15 are needed for the sequence number 370. To set the sequence number 370 length, the expected jitter could be given at call setup, with modifications made based on the actual perceived jitter.

In addition to the sequence number bits 370, a UDP header 380 and an IP header 385 must be included in the UDP packet 15. The header information 380 and 385 include routing information, e. g., the IP address and UDP port number of the receiving node (TRAU 68 or CCU 55) for the UDP packet 15.

In addition to adding some new information, when mapping the TRAU protocol onto UDP, some of the TRAU information normally transferred between the CCU 55 and the TRAU 68 can be removed. For example, as can be seen in FIG. 3B, the bits relating to the frame structure, such as the TRAU synchronization bits 310, tail bits or spare bits 360 and spare control bits, have been removed from the UDP packet 15.

Furthermore, some of the in-band control information 330 normally sent in the TRAU frame 300 is not needed in the UDP packet 15. As an example, with reference now to FIGS. 4A and 4B of the drawings, the main in-band control parameters 330 included in a conventional TRAU Adaptive Multi-Rate (AMR) frame 300 and in an AMR UDP packet 15, respectively, are illustrated. As can be seen, the majority of the in-band control bits 330 remain the same in the UDP packet 15. For example, the Phase Alignment (PA) command 410 (optional), Handover (HO) Information 430, Request or Indication Flag (RIF) 440, Uplink Frame Error (UFE) 450, Discontinuous Transmission (DTX) request 460 (in uplink only), Frame Classification (FC) information 470 and Codec Mode Indication/Codec Mode Request (CMI/CMR) information 480 are still needed.

Figure 4A:
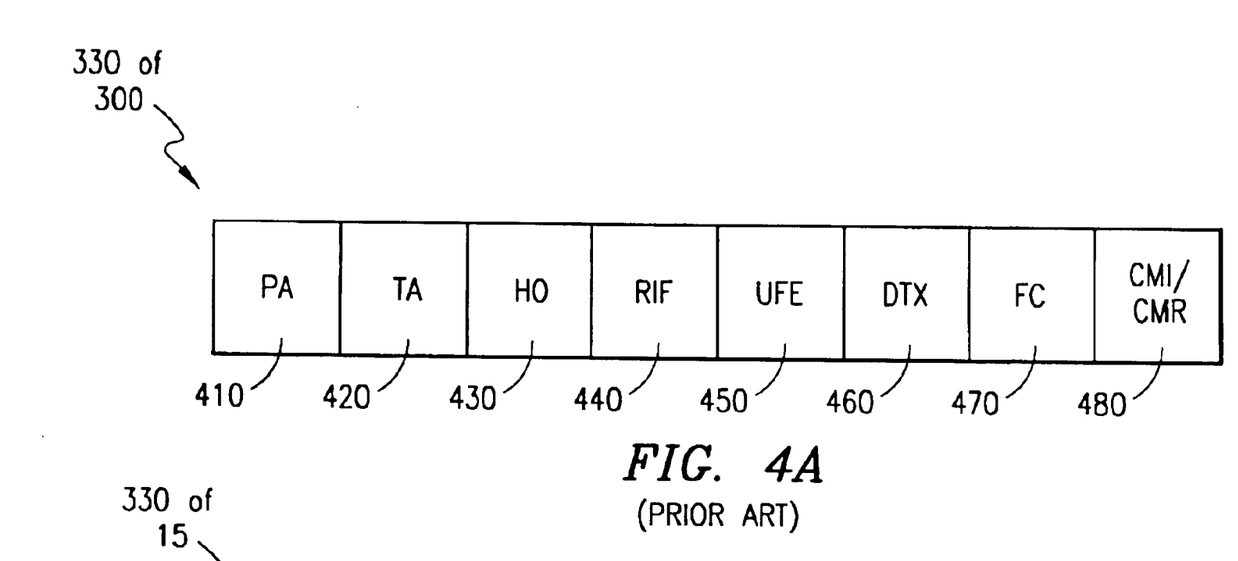
FIG. 4A illustrates the prior art in-band TRAU control bits for an Adaptive Multi Rate TRAU frame type.
Figure 4B:
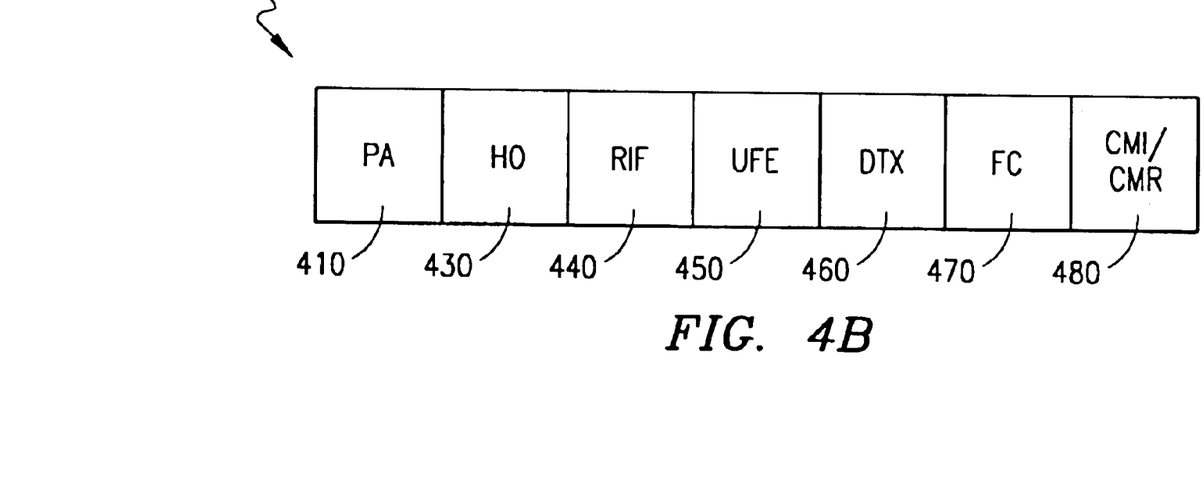
FIG. 4B illustrates the in-band TRAU control bits for an Adaptive Multi Rate TRAU frame type for inclusion in a UDP datagram in accordance with embodiments of the present invention.

However, one of the parameters that does not need to be included in the UDP packet 15 is the Time Alignment 420 command. The Time Alignment 420 command is used in the TRAU protocol to adjust the sending phase so that the buffering delay in the CCU 55 is minimized prior to the information being submitted to the air interface. In a typical circuit-switched scenario, the TRAU 68 begins in an Initial Time Alignment state (default phase), and sends TRAU frames 300 towards the BTS 50 with this default phase. Upon receiving the frames, the CCU 55 calculates the timing adjustment required in order to achieve minimum buffer delay and sets the Time Alignment 420 command parameter in the uplink TRAU frames 300 accordingly. Thereafter, the TRAU 68 uses the timing adjustment sent in the Time Alignment 420 command parameter for all subsequent downlink TRAU frames 300.

Timing adjustments are not used in an IP network 10, since IP is a connectionless protocol that does not guarantee reliable delivery of data. Therefore, as shown in FIG. 4A, the Timing Adjustment 420 command parameter is not included in the in-band control information 330 of the UDP packet 15. However, it should be noted that the Timing Adjustment 420 command parameter could be implemented in an IP network 10 under certain conditions. The jitter in the transmission time must be small. That is, the delay variation of the transmission of UDP packets 15 must be below 10 ms in order to be able to minimize the buffering delay in the CCU 55. With these kinds of stringent requirements, including the Timing Adjustment 420 command parameter in the in-band control information 330 in UDP packets 15 is not recommended.

Figure 5:
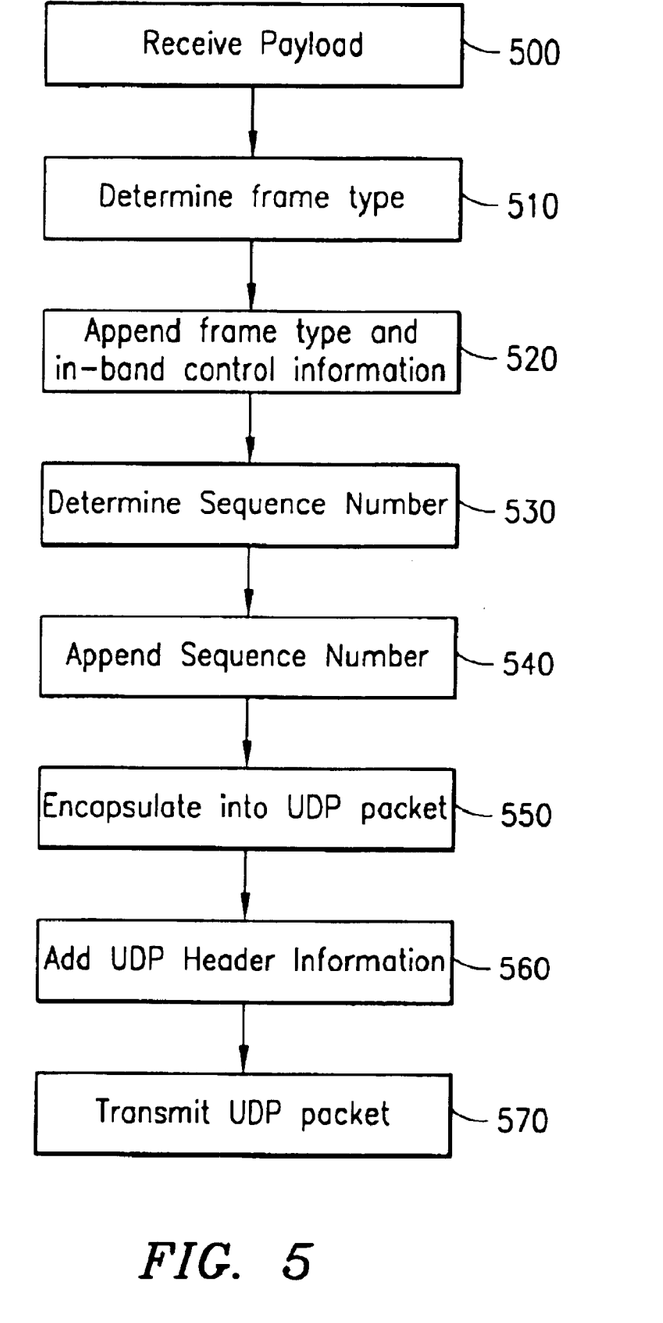
FIG. 5 is a flow chart illustrating the steps for creating a UDP datagram including TRAU frame information, in accordance with preferred embodiments of the present invention.

Thus, ad shown in the steps of FIG. 5, in an IP based BSS architecture, when a payload 340 (data 340) is received at either the CCU 55 or TRAU 68 (step 500), the CCU 55 or TRAU 68 determines the frame type 320 (step 510) and appends the frame type 320 and other relevant in-band control information 330 to the payload 340 and associated parity bits 350, if any (step 520). Thereafter, the CCU 55 or TRAU 68 determines the sequence number 370 of the payload 340 (step 530) and appends this sequence number 370 to the TRAU information 320, 330, 340 and 350 (step 540). Thereafter, all of this information (sequence number 370 and TRAU information 320, 330, 340 and 350) is encapsulated into a UDP packet 15 (step 550), along with UDP header information 380 (step 560), and the UDP packet 15 is transmitted through the IP network 10 to the receiving node (CCU 55 or TRAU 68) (step 570).

It should be noted that the UDP packet defined above could be used to send payloads between all nodes within an IP based network. For example, when there is a mobile to mobile connection, the payload packets can be sent directly between the serving base stations.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A telecommunications system for transmitting Transcoder/Rate Adaptor Unit (TRAU) information in an Internet Protocol (IP) based Base Station System (BSS) architecture via an IP network, said telecommunications system comprising:
   a first node within said IP based BSS architecture that is adapted to:
   receive a payload;
   append TRAU in-band control information relevant to said payload and said IP based BSS architecture to said payload;
   append a sequence number parameter defining a sequence number of said payload to said payload and said TRAU in-band control information, wherein the length of said sequence number is a function of the maximum jitter in said IP network; and
   encapsulate said payload, said TRAU in-band control information and said sequence number parameter into a User Datagram Protocol (UDP) packet, said UDP packet including UDP header information and IP header information; and
   a second node within said IP based BSS architecture and connected to said first node through said IP network, said second node being adapted to receive said UDP packet from said first node through said IP network using said UDP header information and said IP header information.

2. The telecommunications system of claim 1, wherein said UDP header information and IP header information includes at least an IP address associated with said second node.

3. The telecommunications system of claim 2, wherein said UDP header information and IP header information further includes a UDP port number associated with said second node.

4. The telecommunications system of claim 1, wherein said first node is a Channel Codec Unit within a Base Transceiver Station and said second node is a Transcoder/Rate Adaptor Unit within a Media Gateway.

5. The telecommunications system of claim 1, wherein said first node is a Transcoder/Rate Adaptor Unit within a Media Gateway and said second node is a Channel Codec Unit within a Base Transceiver Station.

6. The telecommunications system of claim 1, wherein said UDP packet further comprises:
   frame type information associated with a frame type of said payload, said frame type information being appended to said payload by said first node.

7. The telecommunications system of claim 6, wherein said frame type is selected from the group consisting of: a full rate or enhanced full rate speech frame, an adaptive multi-rate speech frame, a half rate speech frame, an operation and maintenance frame, a data frame, an extended data frame, an idle speech frame and a silence descriptor frame.

8. The telecommunications system of claim 1, wherein said TRAU in-band control information does not include a Time Alignment command parameter.

9. The telecommunications system of claim 1, wherein said UDP packet does not include synchronization bits, tail bits or spare bits.

10. The telecommunications system of claim 1, wherein the length of said UDP packet varies.

11. The telecommunications system of claim 1, wherein said TRAU in-band control information includes at least one of a phase alignment parameter, a handover command parameter, a request or indication flag parameter, an uplink frame error parameter, a discontinuous transmission request parameter, a frame classification parameter or a code mode indication or code mode request parameter.

12. A method for transmitting Transcoder/Rate Adaptor Unit (TRAU) information in an Internet Protocol (IP) based Base Station System (BSS) architecture via an IP network, said method comprising the steps of:
   receiving a payload at a first node within said IP based BSS architecture;
   appending TRAU in-band control information relevant to said payload and said IP based BSS architecture to said payload by said first node;
   appending a sequence number parameter defining a sequence number of said payload to said payload and said TRAU in-band control information by said fist node; wherein the length of said sequence number is determined as a function of the maximum jitter in said IP network;

encapsulating said payload, said TRAU in-band control information and said sequence number parameter into a User Datagram Protocol (UDP) packet, said UDP packet including UDP header information and IP header information identifying a second node within said IP based BSS architecture; and transmitting said UDP packet to said second node through said IP network.

13. The method of claim 12, further comprising the step of:

appending frame type information associated with a frame type of said payload to said payload by said first node.

14. The method of claim 12, wherein said step of appending TRAU in-band control information further comprises the step of:

appending at least one of a phase alignment parameter, a handover command parameter, a request or indication flag parameter, an uplink frame error parameter, a discontinuous transmission request parameter, a frame classification parameter or a code mode indication or code mode request parameter to said payload.

15. The method of claim 12, wherein said step of encapsulating further comprises the step of:

encapsulating said payload, said TRAU in-band control information and said sequence number parameter into said UDP packet without including a Time Alignment command parameter within said TRAU in-band control information.

16. The method of claim 12, wherein said step of encapsulating further comprises the step of:

encapsulating said payload, said TRAU in-band control information and said sequence number parameter into said UDP packet without including synchronization bits, tail bits or spare bits within said UDP packet.

* * * * *